(12) United States Patent
Winter

(10) Patent No.: US 6,654,542 B1
(45) Date of Patent: Nov. 25, 2003

(54) METHOD FOR MARKING DIGITAL DATA

(75) Inventor: Marco Winter, Hannover (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/569,749

(22) Filed: May 12, 2000

(30) Foreign Application Priority Data

May 18, 1999 (EP) ............................................ 99109782

(51) Int. Cl.⁷ ............................ H04N 5/91; H04N 5/90; H04N 5/85; H04N 5/781; H04N 7/04; H04N 7/06; H04N 7/08; H04N 7/52

(52) U.S. Cl. ......................................... 386/95; 386/125

(58) Field of Search .................... 386/45, 95, 125–126; 375/240.26

(56) References Cited

U.S. PATENT DOCUMENTS

| 5,717,663 | A | | 2/1998 | Fujita ........................... 369/32 |
| 6,118,924 | A | * | 9/2000 | Nakatani et al. ............... 386/70 |
| 6,181,870 | B1 | * | 1/2001 | Okada et al. .................. 386/95 |
| 6,308,005 | B1 | * | 10/2001 | Ando et al. .................... 386/95 |
| 6,339,672 | B1 | * | 1/2002 | Ando et al. .................... 386/69 |
| 6,341,196 | B1 | * | 1/2002 | Ando et al. .................... 386/95 |

FOREIGN PATENT DOCUMENTS

| EP | 0833337 A2 | 4/1988 | ........... G11B/27/34 |
| EP | 0406021 A2 | 1/1991 | ............ G11B/7/00 |
| EP | 0635835 A2 | 1/1995 | ........... G11B/27/32 |
| EP | 0680046 A2 | 11/1995 | ......... G11B/27/029 |
| EP | 0681292 A2 | 11/1995 | ......... G11B/27/036 |
| EP | 0903742 A2 | 3/1999 | ......... G11B/27/034 |
| EP | 0926903 A1 | 6/1999 | .......... H04N/9/804 |
| EP | 0986062 A1 | 3/2000 | ........... G11B/27/32 |
| WO | WO99/38166 | 7/1999 | ........... G11B/27/00 |
| WO | WO00/02195 | 1/2000 | ............ G11B/7/00 |
| WO | WO00/04539 | 1/2000 | ........... G11B/19/02 |

OTHER PUBLICATIONS

Search Report and Priority Document.

Search Report.

* cited by examiner

Primary Examiner—Thai Tran
Assistant Examiner—Polin Chieu
(74) Attorney, Agent, or Firm—Joseph S. Tripoli; Joseph J. Laks; Ronald H. Kurdyla

(57) ABSTRACT

According to the invention a method is proposed introducing a temporarily erased flag and two offset values (TE_S_OFF, TE_E_OFF) in order to indicate a cell to be temporarily erased and exactly address the Stream Object Units (SOBU), which can be erased completely. Permanent erasure on the fly without any additional view into the streams or quick permanent erasure can be achieved. Advantageously the temporarily erasure can be withdrawn completely also.

4 Claims, 2 Drawing Sheets

METHOD FOR MARKING DIGITAL DATA

The invention relates to a method for marking data of a digital data stream representing video or audio information.

BACKGROUND

In bitstream recording one is free to subdivide the bitstream into sub-units of more regular structure. Presentation data in DVDs (digital video or versatile disc) is organized into units called Video Object Unit, denoted VOBU, e.g. in the DVD Specifications for Video Recording. VOBUs have a variable size (data amount measured in number of sectors), but have also a variable duration (measured in number of video fields).

For data retrieval from the disc the DVD Specifications for Video Recording foresees a 'VOBU map' which is a table where for every VOBU in a recording the length in sectors and the duration in fields is entered.

INVENTION

It is one object of the invention to disclose a method for marking digital data as being temporarily erased in such a way, that on the fly permanent erasure can be achieved without any additional view into the streams.

According to the invention, this object is achieved by means of the features specified in main claims. Advantageous designs and developments are specified in subclaims.

The directory and file structure of DVD Stream Recording is organized in Stream Data and Navigation Data of the DVD Stream Recording as follows:

Any DVD Streamer Device has certain requirements to store its own, Streamer-specific navigation data on the disc. These data are solely for helping the retrieval of recorded data; they need not be understood or even be visible to any outside Application Device.

Any DVD Streamer Device needs to communicate with the Application Device it is connected to. This communication should be straightforward, and as universal as possible, so that the maximum possible range of applications—both today and future—can be connected to the Streamer. The Navigation Data to support such communication must be understandable by the Streamer as well as by the Application Device; they will be called "Common navigation data" in the following.

The Streamer Device should offer to the connected Application Device a means for storing its own private data of any desired kind. The Streamer needs not to understand any of the content, internal structure, or meaning of this "Application-specific navigation data".

Navigation data is provided to control the recording, playing back, and editing of any bitstreams that are recorded. In DVD Stream Recording, Navigation Data is called "Streamer Information" (STRI). STRI consists of six kinds of information tables, namely Streamer Video Manager Information (STR_VMGI), Stream File Information Table (SFIT), Original Program Chain Information (ORG_PGCI), User Defined Program Chain Information (UD_PGCI), Text Data Manager (TXT_DT_MG), and Application Private Data Manager (APD_MG).

The Stream File Information Table contains the information where on the recording media the stream data are recorded. The Original PGC Information has the function of a play list, which contains all takes which were made. A take is defined as containing the information between a start and a stop action in the sequence of recording or also called one program of the ORG_PGCI. In addition, a Stream Object (SOB) contains a full take or part of a take. With both tables the data can be retrieved for playback.

The User Defined PGC Information contains information, which are defined by a user.

In order to address more precisely a program contains one or more cells. A cell points to Stream Object Units (SOBU) and to each SOBU an Incremental Application Packet Arrival Time (IAPAT) is assigned.

According to the invention besides a temporarily erased flag TE two offset values are introduced in order to indicate a SOBU, which can be erased completely for storing additional information.

In order to exactly address the SOBUs, which can be completely erased the two offset values (TE_S_OFF and TE_E_OFF) shall be added to the Cell Type (C_TY) flag. The exact location of these SOBUs is given by a Stream Cell Start Application Packet Arrival Time (SC_S_APAT), Stream Cell End APAT (SC_E_APAT), a mapping list (MAPL) and these two additional offsets TE_S_OFF, TE_E_OFF. For example the calculation of the start of the first temporarily erased SOBU starts with a coarse location via SC_S_APAT and the MAPL. The search via the MAPL results in 2 possible positions of the assigned SOBU, e. g. SOBU #m or SOBU #m+1. In order to define exactly, whether SC_S_APAT is the first application packet of a SOBU or not the offset value TE_S_OFF contains the needed additional offset with values 0, 1 or 2 to locate the desired SOBU relative to the coarse result of the search via the MAPL.

According to the invention the structure of the C_TY byte is as follows:

| b7 | b6 | b5 | b4 | b3 | b2 | b1 | b0 |
|----|----|----|----|----|----|----|----|
| C_TY1 ||| TE | TE_S_OFF || TE_E_OFF ||

| | |
|---|---|
| C_TY1 | '010b' shall be described for all Stream Cells. |
| TE | '0b': This Cell is in the "Normal" state. TE_S_OFF and TE_E_OFF shall be set to '00b'. |
| | '1b': This Cell is in "Temporarily Erased" state. |
| TE_S_OFF | '00b', '01b', '10b': The first TE SOBU starts TE_S_OFF SOBUs later than the SOBU number calculated from SC_S_APAT via the MAPL. |
| | '11b': reserved |
| TE_E_OFF | '00b', '01b', '10b': The SOBU number of the first SOBU after the last TE SOBU of the TE Cell starts TE_E_OFF SOBUs later than the SOBU number calculated from SC_E_APAT via the MAPL. |
| | '11b': reserved |

DRAWINGS

Embodiments of the invention are described with reference to the accompanying drawing, which show in:

FIG. 1 Temporary erasure and subsequent permanent erasure;

FIG. 2 TE and subsequent further TE and reconstruction of the first TE cell

EXEMPLARY EMBODIMENTS

Exemplary embodiments of the invention are explained in more detail in the following description.

The gray parts mark the not presentable TE parts of the stream. The dark gray parts mark the temporarily erased complete SOBUs.

Figure 1:
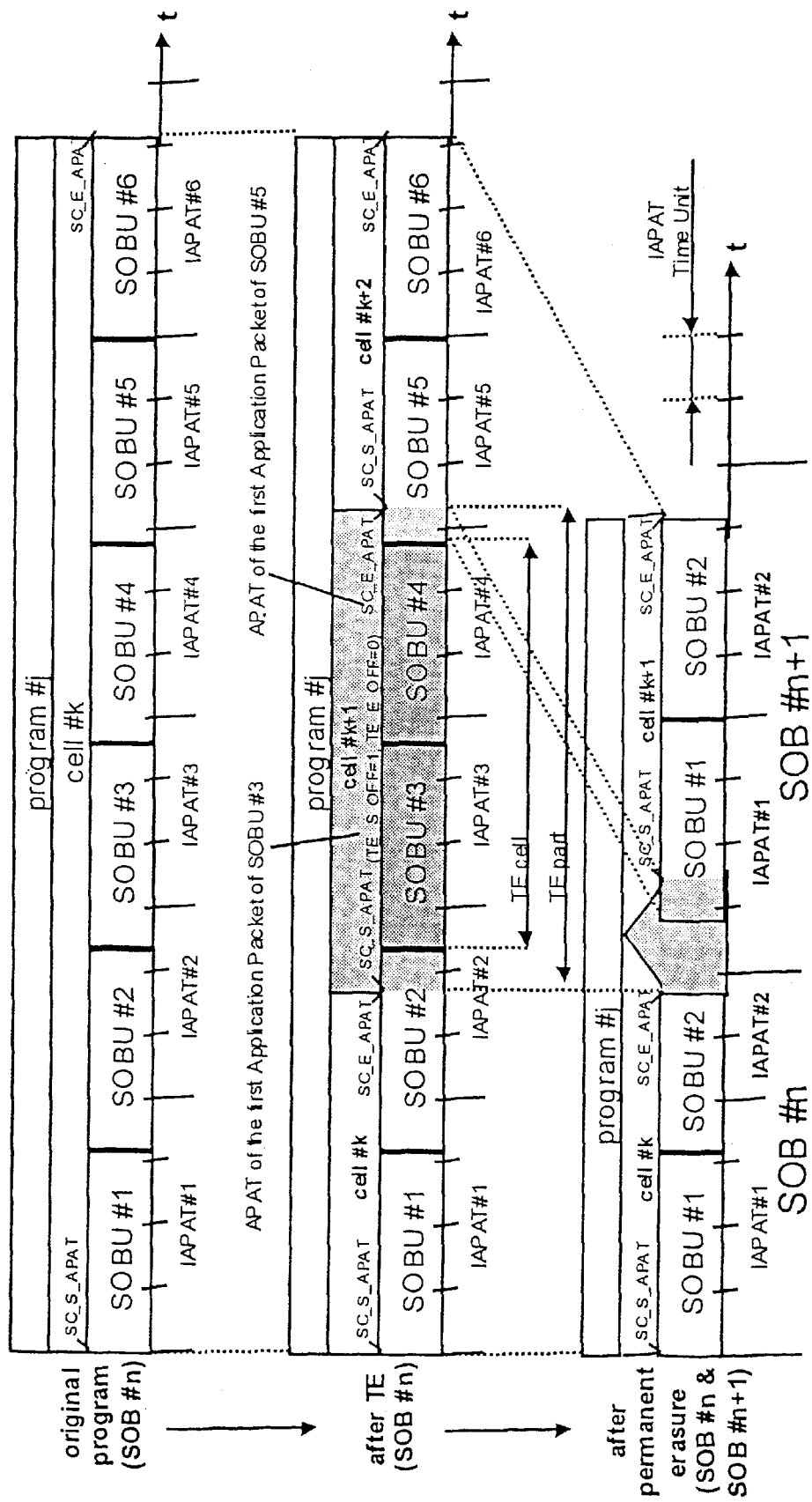
FIG. 1 shows a temporary erasure with a subsequent permanent erasure of the just temporarily erased part.
Figure 2:
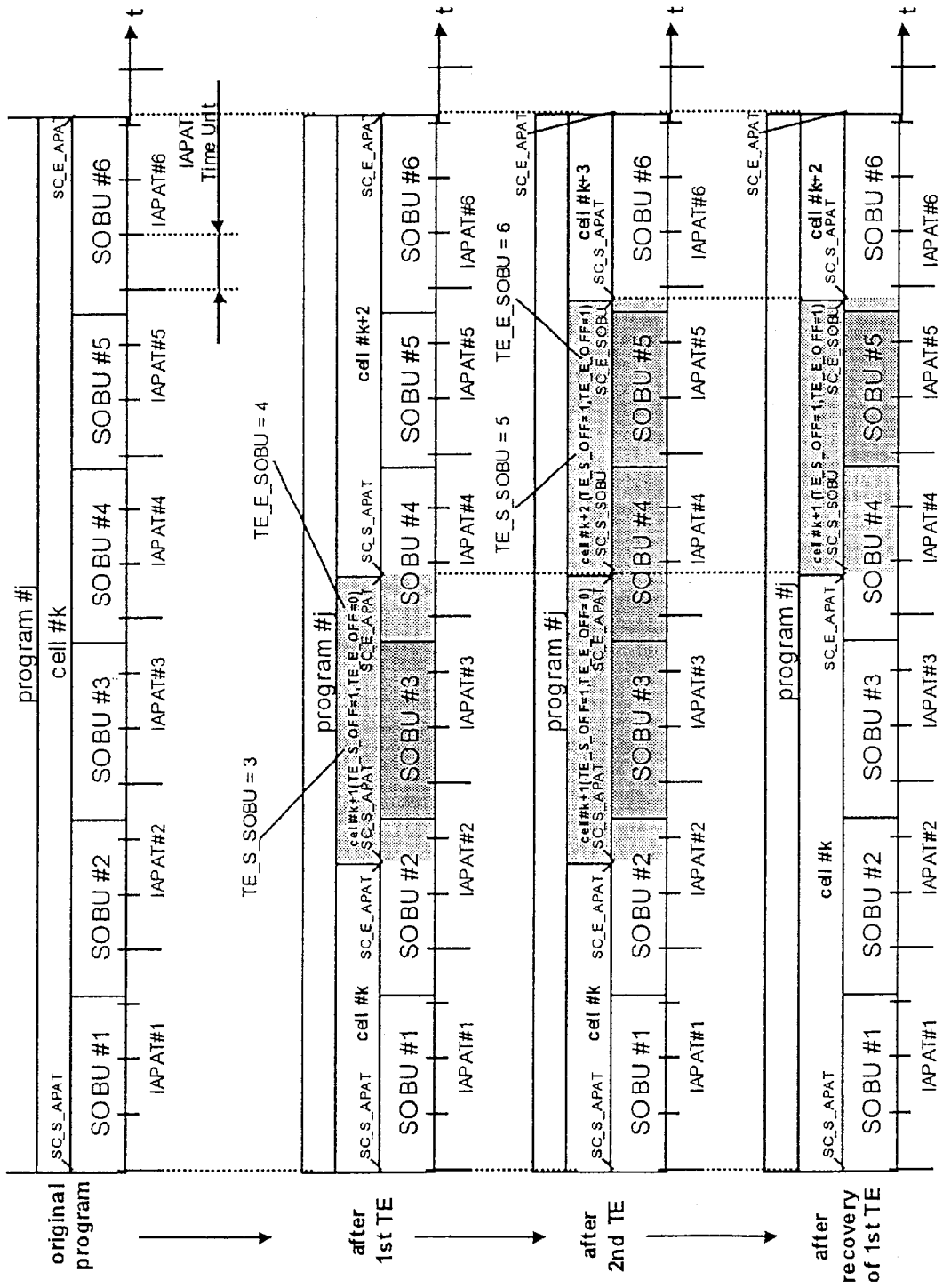
FIG. 2 shows a temporary erasure with a subsequent second temporary erasure behind the just temporarily erased part.

In FIG. 1 TE and Permanent Erasure seen from SOBU level is shown. In the upper part of the drawing labeled "original program" a program #j contains one cell #k with one SC_S_APAT and one SC_E_APAT. The cell #k contains several SOBUs from SOBU #1 to SOBU #6. To each SOBU an Incremental Application Packet Arrival Time (IAPAT) is assigned.

In the middle part labeled "after TE" the gray marked part of program #j is marked for example by a user or based on given parameter as being temporarily erased. The program #j contain now 3 cells from cell #k to cell #k+2. Cell #k and cell #k+2 can be played back, while on cell #k+1 an erased flag is set. Cell #k+1 contains a TE part in gray, which was decided to be erased and a smaller TE cell in dark gray, which can be used for later recording.

To cell #k a new SC_E_APAT and to cell #k+2 a new SC_S_APAT are assigned. To the cell #k+1 a new SC_S_APAT and 2 a new SC_E_APAT are assigned. SC_S_APAT of cell #k+1 is smaller than SC_E_APAT of cell #k and SC_E_APAT of cell #k+1 is smaller than SC_S_APAT of cell #k+2.

In the lower part labeled "after permanent erasure" the program #j contains only two cells, that are cell. #k and cell #k+1 (former cell #k+2), while the TE cell of the former cell #k+1 was erased.

The SOBUs of each cell #k and cell #k+1 have been renumbered and also the assigned IAPATs. As shown in this example a small area marked in gray remains in the bit stream, which can not be used for recording of further data.

After permanent erasure the Stream File Information, the Original PGC Information and the User Defined PGC Information are updated.

Re-use of TE cells on-the-fly during recording. The TE cells contain 2 offset values: TE_S_OFF and TE_E_OFF. The actual intention of these 2 offsets is to allow to reuse TE SOBUs during recording, i.e. when the disc becomes full during recording, then the streamer shall be able to permanently erase TE cells, in order to get new free SOBUs to continue the recording without any break. The APATs SC_S_APAT and SC_E_APAT of the TE cell aren't exact enough for this purpose, because a search via the MAPL results in 2 possible positions of the assigned SOBU (SOBU #m or SOBU #m+1 ). A search via the MAPL would require an additional search inside the stream. That's not possible in real-time. But, with TE_S_OFF and TE_E_OFF the exact SOBU position is locatable without any view into the stream.

Rules for TE Cells

The information stored in the TE cells shall be defined in a way
   that the original state of the program is 100% reconstructable and
   that the by the TE part completely covered SOBUs are indicated. This is demanded in order to be able to reuse complete SOBUs of TE parts on-the-fly during recording, i.e. without any view into the stream.
This will be performed by TE_S_OFF and TE_E_OFF of C_TY. Two locations are defined by these values:

1. TE_S_SOBU=TE_S_OFF+(SOBU number, derived from SC_S_APAT via the MAPL)
2. TE_E_SOBU=TE_E_OFF+(SOBU number, derived from SC_E_APAT via the MAPL)

The 'SOBU number, derived from SC_S_APAT via the MAPL' is the number of that SOBU which contains the Application Packet with APAT=SC_S_APAT or of the previous SOBU depending on the mapping list resolution IAPAT. Therefore, an exact set of TE_S_OFF and TE_E_OFF requires a view into the stream. TE_S_OFF shall be chosen, so that TE_S_SOBU fulfills following rules:
1. if SC_S_APAT is the first Application Packet of a SOBU or the TE Cell contains the start of the SOB, then TE_S_ is the SOBU number of that SOBU which contains the Application Packet with the APAT SC_S_APAT.
2. In all other cases TE_S_SOBU is equal to the SOBU number of that SOBU which follows immediately the SOBU containing the Application Packet with the APAT SC_S_APAT.
3. TE_S_ addresses the SOBUs of a SOB relative to its start, i.e. TE_S_SOBU=1 locates the first SOBU of the SOB.

TE_E_OFF shall be chosen, so that TE_E_SOBU fulfills following rules:
1. TE_E_SOBU is equal to the SOBU number of that SOBU which contains the Application Packet immediately following the TE Cell.
2. TE_E_SOBU addresses the SOBUs of a SOB relative to its start, i.e. TE_E_SOBU=1 locates the first SOBU of the SOB.

TE_E_SOBU may indicate the SOBU in case the last application packet of a SOBU is temporarily erased after the last SOBU of the TE cell or of the SOB.

The 3 possible cases of TE_S_SOBU and TE_E_SOBU of an TE Cell:
1) TE_S_SOBU<TE_E_SOBU There is at least one complete SOBU inside the TE part of this TE cell. All complete SOBUs of this TE Cell can be permanently erased, e.g. during recording.
2) TE_S_SOBU=TE_E_SOBU
   There is no complete SOBU inside the TE Cell. But the TE Cell has Application Packets in 2 SOBUs. A permanent erasure would split the assigned SOB between these 2 SOBUs into 2 SOBs. I.e. the resulting 2 SOBs doesn't share any SOBU.
3) TE_S_SOBU>TE_E_SOBU There is no complete SOBU inside the TE Cell. The TE Cell has Application Packets only in 1 SOBU. A permanent erasure would split the assigned SOB inside one SOBU into 2 SOBs. I.e. the resulting 2 SOBs share a common SOBU.

So, each state is unambiguous and contains a lot of information about the location of the Cells inside the stream.

Alternative solution.

C_TY can be described in an other formats like
(1) C_TY
   Describes the Cell Type of this Stream Cell.

| b7 | b6 | b5 | b4 | b3 | b2 | b1 | b0 |
|----|----|----|----|----|----|----|----|
| C_TY1 | | | | reserved | TE_S_OFF | | TE_E_OFF |

C_TY1     '010b' shall be described for all Stream Cells.
TE_S_OFF  '00b': This is a Normal Cell (TE_E_OFF must also be '00b')

-continued

| | |
|---|---|
| | '01b', '10b', '11b': The first TE SOBU starts (TE_S_OFF-1) SOBUs later than the SOBU number calculated from SC_S_S_APAT via the MAPL. |
| TE_E_OFF | '00b': This is a Normal Cell (TE_S_OFF must also be '00b')<br>'01b', '10b', '11b': The SOBU number of the first SOBU after the last TE SOBU of the TE Cell starts (TE_E_OFF-1) SOBUs later than the SOBU number calculated from SC_E_APAT via the MAPL. |

In order to distinguish a normal cell from a temporarily erased cell C_TY[3..0]==0, when this is a Normal Cell, else this is a TE Cell.

With this definition, a TE Cell is also unambiguous described, but bit 4 of C_TY is still free for other purposes.

What is claimed is:

1. A method for marking data of a digital data stream representing video or audio information including the following steps:

in order to exactly address a Stream Object Unit, which can be completely erased the two offset values are added to a Cell Type flag, whereby the first offset value is chosen, that a Temporary Erased Start Stream Object Unit fulfills the rules:

if the Start Application Packet Arrival Time is the first Application Packet of a Stream Object Unit or a Temporary Erased Cell contains the start of the Stream Object, then the Temporary Erased Start Stream Object Unit is the Stream Object Unit number of that Stream Object Unit which contains the Application Packet with the Start Application Packet Arrival Time, in all other cases the Start Application Packet Arrival Time is equal to the Stream Object Unit number of that Stream Object Unit which follows immediately the Stream Object Unit containing the Application Packet with the Start Application Packet Arrival Time, whereby the second offset value is chosen, that a Temporary Erased Start Stream Object Unit fulfills the rules:

the Temporary Erased End Stream Object Unit is equal to the Stream Object Unit number of that Stream Object Unit which contains the Application Packet immediately following the Temporary Erased Cell.

2. The method according to claim 1, characterized by, that the Temporary Erased Start Stream Object Unit addresses the Stream Object Units of the Stream Object relative to its start.

3. The method according to claim 1, characterized by, that the Temporary Erased End Stream Object Unit addresses the Stream Object Units of the Stream Object relative to its start.

4. The method according to claim 1, characterized by, that the Temporary Erased Start Stream Object Unit is equal to the first offset value + the Stream Object Unit number, derived from Start Application Packet Arrival Time via a mapping list, the Temporary Erased End Stream Object Unit is equal to the second offset value + the Stream Object Unit number, derived from End Application Packet Arrival Time via the mapping list.

\* \* \* \* \*